March 16, 1937.  W. R. GRISWOLD  2,073,692
CONTROL MECHANISM
Filed July 8, 1932

Inventor
WALTER R. GRISWOLD.
By
Attorney

Patented Mar. 16, 1937

2,073,692

UNITED STATES PATENT OFFICE 2,073,692

CONTROL MECHANISM

Walter R. Griswold, Detroit, Mich., assignor to Packard Motor Car Company, Detroit, Mich., a corporation of Michigan Application July 8, 1932, Serial No. 621,375

9 Claims. (Cl. 192—3.5)

This invention relates to motor vehicle transmission mechanism and more particularly to clutch actuating mechanism.

In the operation of motor vehicles having the conventional form of transmission mechanism, it is necessary, upon shifting the gears for changing the speed ratio, to first disengage the engine drive shaft and the transmission driven shaft through manual release of a clutch. This operation for controlling the clutch usually requires considerable effort on the operator's part and must be employed frequently in congested traffic where many stops must be made. Reduction of so much manual effort in the operation of the clutch control mechanism is therefore desirable.

It is an object of the present invention to provide a new and novel mechanism for automatically releasing the clutch.

Another object of the invention is to provide a clutch operating mechanism which can be actuated by power means which is controlled through the operation of the lever for changing the speed ratio in the transmission mechanism.

A further object of the invention is to provide clutch control mechanism which is optionally operable, either by a power means or by manual effort.

Other objects of the invention will appear from the following description taken in connection with the drawing, which forms a part of this specification, and in which.

Figures 1, 2, 3:
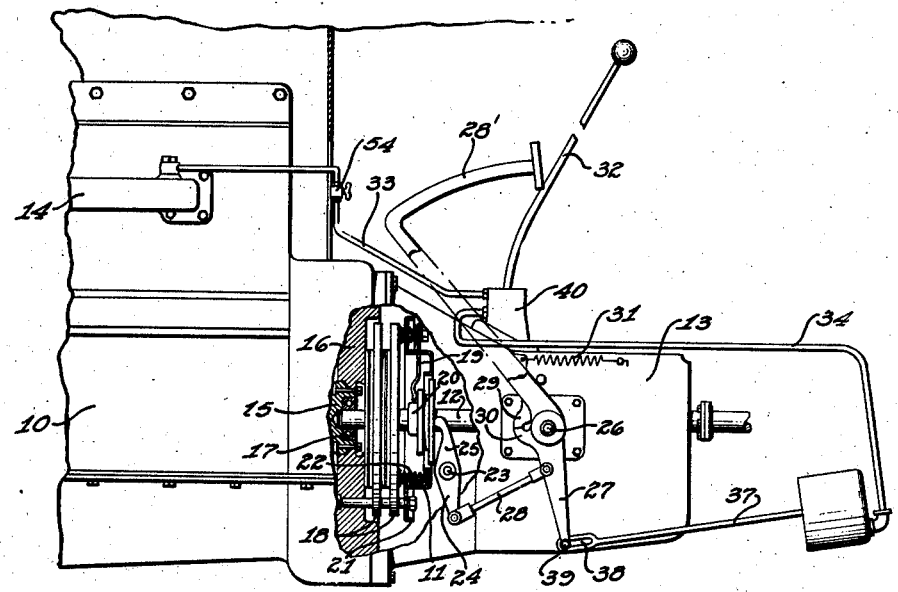
Fig. 1 is a side elevational view, partly broken away and partly in section, of a motor vehicle power transmitting mechanism having my invention associated therewith.
Fig. 2 is an enlarged sectional view of the gear shift mechanism housing showing the associated valve mechanism for controlling the power means which actuates the clutch.
Fig. 3 is a side view, partly broken away, showing the vacuum controlled piston and its cylinder forming a part of the clutch operating mechanism.

Referring now to the drawing by characters of reference, I have illustrated a power transmission mechanism which includes an internal combustion engine 10, a clutch 11 and a driven transmission shaft 12 which extends into a casing 13 containing a conventional form of change speed gearing (not shown). The engine has associated therewith the usual form of intake manifold 14 and driving shaft 15 to which the flywheel 16 is fixed and the forward end of the transmission drive shaft is mounted in the usual manner in the bearing 17 carried by the rear end of the driving shaft.

The clutch is of a conventional type consisting of plates having frictional faces engaging with the flywheel and pressure members 18. The rear pressure plate has bolts extending through release levers 19 which are rocked by the sleeve 20 bearing against the cover 21 in a manner such that when the sleeve is moved forward and engages the release levers, the rear pressure plate will be moved rearward and thereby release the clutch. Coil springs 22 extend between the cover plate and the rear pressure member to normally hold the clutch in engaged position.

Mechanism is associated with the clutch through the manipulation of which it is thrown out. A shaft 23 extends through the casing 13 and pivotally mounted thereon is a lever 24 having a forked end 25 engaging the sleeve 20 on opposite sides of the driven shaft 12. A shaft 26 is also carried by the casing 13 and a lever 27 is pivotally mounted thereon and connected with the lever 24 by a link 28. Such mechanism can be selectively operated either manually or through power means controlled manually.

To one end of the lever 27 is connected a power control mechanism and associated with the other end of the lever is a foot lever 28' which is mounted on the shaft 26 beside the lever 27 and formed with a boss 29 arranged to bear upon a boss 30 formed on the lever 27. A coil spring 31 is connected to the foot lever and to the casing 13 in a manner normally holding the pedal portion of the lever in its rear position under which circumstance the clutch will be engaged. When it is desired to release the clutch manually, the foot lever is pressed forwardly so that the boss 29 will be swung downwardly carrying the boss 30 therewith and thus rocking the lever 27 to the rear and rocking the forked portion 25 of the rock lever 24 forwardly through means of the link 28 so that the sleeve 20 will actuate the clutch release levers 19 to move the rear pressure plate rearwardly.

I prefer to control the power mechanism by the gear shift lever 32, however, other suitable mechanism can be utilized for this purpose. The power mechanism for controlling the clutch can be of various forms but, for the purpose of illustration, I have illustrated it as a vacuum operated mechanism in which there is a conduit 33 communicating with the engine manifold 14, a conduit 34 communicating with the interior of a vented cylinder 35 in which is arranged a piston 36. A rod 37 is connected at one end to the piston and is provided at its other end with a slot 38, a connector 39 extending through such slot and securing the rod to the lower end of the lever 27. Through means of this slot, the foot lever can be operated to actuate the clutch mechanism without affecting the position of the rod 37. Likewise the rod 37 can be moved rearwardly by the power means to actuate the clutch control linkage without affecting the position of the foot lever 28' as the boss 30 is free to move away from the boss 29.

In order that the power mechanism can be controlled by the gear shift lever, I provide the post 40 on the casing 13 with a duct 41 to which the conduit 33 is connected, with a duct 42 to which the conduit 34 is connected, and with a duct 43 connecting the ducts 41 and 42. Bearing members 44 are slidably mounted in a hollow portion 45 of the post and are provided with curved faces which engage opposite sides of the ball 46 formed on the gear shift lever, and suitable coil springs 47 hold the bearings against the ball and thus the gear shift lever is pivotally mounted in the post. One of the bearing members is provided with a pilot end 48 and the other bearing member is provided with a pilot end 49 which is of reduced diameter at two separate places adjacent its end, thus forming an intermediate valve portion 50 which can be moved back and forth to open and close the duct 43. The lower end of the gear shift lever engages the transmission gear shifter fork shafts 51 in the conventional manner and such shafts are provided with detents into which stop means, such as balls 52, are pressed by coil springs 53 to normally hold the gear shift mechanism in adjusted position. A valve 54 is provided in the conduit 33 so that connection with the manifold can be entirely cut off if desired.

It will be seen that the clutch operating mechanism can be actuated either by hand or by power means controlled manually. When the lever 28' is moved forwardly, the lever 27 will be moved rearwardly and through the medium of the rod 28 will rock the forked end of lever 24 forwardly, thus throwing out the clutch. The connector 39 will slide rearwardly in the slot 38 in rod 37 so that, in the manual operation, the rod 37 will not be moved nor will it offer any resistance to manual movement of the lever 27.

Assuming that the valve 54 is open, a passageway extends from the manifold to the interior of the cylinder 35 which is open except for the valve means 50 associated with the bearing pilot 49. The springs 47 are weaker than the shifter fork retaining springs 53 and, when the lever is first shifted from one change speed position to another, the bearing portion 46 will exert pressure against one or the other of the bearings 44 sufficient to overcome the pressure of the opposing spring 47 so that the pilot portion 49 will be moved in the same direction as that in which pressure is exerted and will thus move the valve portion 50 in one direction or the other to open the duct 43. When the passage 43 is open, vacuum in the cylinder 35 will move the piston to the right, as shown in Fig. 3, and will thus move the lever 27 therewith through means of the connector 39 and will draw the rod 28 rearwardly, thus rocking the lever 24 so that the forked portion moves forwardly and throws out the clutch. It is obvious that, when the gear shift lever is moved in a forward direction, it will exert pressure directly against the bearing from which the pilot 49 extends and will overcome the pressure of the spring 47 and, under such circumstances, the other spring 47 will make the bearing having the pilot 48 follow the bearing portion 46 of the lever. When the lever is shifted rearwardly, pressure will be exerted against the slidable bearing having the pilot 48 and the spring associated with the bearing having the pilot 49 will cause it to follow the bearing portion 46 of the gear shift lever and, in this way, will move the valve rearwardly to open the duct 43. When the shifter fork has been moved into a position establishing the desired gear ratio, release of the lever 32 will allow the springs 47 to equalize and thereby move the valve 50 into a position closing the duct 43.

A passage 70 is formed in the post 40 to connect the duct 42 with atmosphere so that the vacuum system associated with the cylinder will be vented when the valve 50 is in closed position. The passage 70 extends through the recess in which the valve 50 reciprocates, and the valve is formed to control the passage 70 so that, when the duct 43 is open, the passage 70 will be closed and when the duct 43 is closed, the passage 70 will be open.

It will thus be seen that the clutch is disengaged by the power means upon initial movement of the change speed lever and that it will be maintained in disengaged relation until the gear shift lever has completed its movement into another position, and thus the clutch is held out of engagement through the operation of gear shifting and without the necessity for any manual exertion or pressure other than that required for shifting gears.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a power transmission, the combination of a clutch control mechanism, a gear shift lever, bodily movable pivot means for the lever, means for actuating the clutch control mechanism, and a connection between said actuating means and said pivot means, said connection being actuated by bodily moving said pivot means.

2. In a power transmission mechanism, the combination of a clutch control mechanism, a gear shift lever, a bodily movable pivot means for the lever, power operated means for actuating the clutch control mechanism to release the clutch, and control means between the pivot means and the power means, the movement of said pivot means bodily operating the control means.

3. In a power transmission mechanism, a clutch control mechanism, power means connected to actuate the clutch control mechanism, a valve controlling the application of the power means, a gear shift lever, a bodily movable pivot means for the lever, and connecting means between the pivot means and the valve, the movement of said pivot means bodily controlling the position of the valve.

4. In a power transmission mechanism, a clutch control mechanism, means for actuating the clutch control mechanism including a vacuum conduit extending through a portion of the transmission casing, a change speed lever extending through a wall of the casing, a movable bearing for the change speed lever, and a valve controlling the conduit and associated with the bearing, shifting movement of the lever moving the bearing in a direction to operate the valve.

5. In a power transmission mechanism, a clutch, disengaging mechanism connected to the clutch, power means for actuating the mechanism including a conduit, a change speed lever, movable bearings for the change speed lever, a valve connected to move with one of the bearing members, and opposed spring means associated with the bearing.

6. In a power transmission mechanism, a clutch, mechanism associated to throw out the clutch, power means for operating said clutch throw out mechanism, a valve controlling the power means, a gear shift lever having a bodily movable bearing, and a connection between the valve means and the bearing whereby movement of the lever bearing will control the valve means.

7. In a power transmission mechanism, a clutch, mechanism associated to throw out the clutch, power means for operating said clutch throw out mechanism, a valve controlling the power means, a gear shift lever having bodily movable fulcrum means, and a connection between the valve means and the lever fulcrum means.

8. In a power transmission mechanism, a clutch operating mechanism, a power cylinder having a piston therein, a connection between the clutch operating mechanism and the piston, a vacuum conduit connected with the cylinder for operating the piston, a valve associated with the conduit, a change speed lever, a bodily movable pivot means for the lever, and a connection between the pivot means and the valve, said connection being operated to control the valve upon movement of the pivot means bodily by the lever.

9. In combination, a clutch, a transmission, a manually operable lever attached to said transmission, a speed changing device engaging the end of said lever, a clutch control device operable by fluid pressure operatively connected to the middle portion of said lever, and means adapted to convert said lever from a lever of the second class to a lever of the first class.

WALTER R. GRISWOLD.